(12) United States Patent
Kim et al.

(10) Patent No.: US 11,276,846 B2
(45) Date of Patent: Mar. 15, 2022

(54) METHOD FOR MANUFACTURING ELECTRODE FOR SECONDARY BATTERY AND ELECTRODE MANUFACTURED THEREBY

(71) Applicant: LG Chem, Ltd., Seoul (KR)

(72) Inventors: Ki Tae Kim, Daejeon (KR); Chang Wan Koo, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/605,415

(22) PCT Filed: Sep. 21, 2018

(86) PCT No.: PCT/KR2018/011281
§ 371 (c)(1),
(2) Date: Oct. 15, 2019

(87) PCT Pub. No.: WO2019/059724
PCT Pub. Date: Mar. 28, 2019

(65) Prior Publication Data
US 2020/0321599 A1    Oct. 8, 2020

(30) Foreign Application Priority Data
Sep. 25, 2017    (KR) .................. 10-2017-0123727

(51) Int. Cl.
*H01M 4/04*    (2006.01)
*H01M 4/62*    (2006.01)
(Continued)

(52) U.S. Cl.
CPC ....... *H01M 4/0409* (2013.01); *H01M 4/0404* (2013.01); *H01M 4/623* (2013.01);
(Continued)

(58) Field of Classification Search
USPC .................................................. 427/58, 115
See application file for complete search history.

(56) References Cited

U.S. PATENT DOCUMENTS 5,219,685 A * 6/1993 Taniguchi ................ C08K 3/22
429/206
5,393,617 A * 2/1995 Klein .................... H01M 4/364
429/59
(Continued)

FOREIGN PATENT DOCUMENTS

CN    104037447 A    9/2014
CN    105051960 A    11/2015
(Continued)

OTHER PUBLICATIONS

Extended European Search Report including Written Opinion for Application No. EP18858822.2 dated May 27, 2020.
(Continued)

*Primary Examiner* — Brian K Talbot
(74) *Attorney, Agent, or Firm* — Lerner, David, Littenberg, Krumholz & Mentlik, LLP (57) ABSTRACT

The present invention provides a method for manufacturing an electrode, the method comprising the steps of: preparing a lump of mixture bulk; milling the mixture bulk to prepare granular powder having an average particle diameter of 30 micrometers to 180 micrometers; sprinkling the granular powder on the surface of a metal current collector; and rolling the granular powder on the metal current collector to laminate the granular powder on the metal current collector.

7 Claims, 4 Drawing Sheets

: active material

: Carbon black

: Fibrosis binder(PTFE)

(51) Int. Cl.
  *H01M 4/02* (2006.01)
  *H01M 4/58* (2010.01)
  *H01M 4/139* (2010.01)
  *H01M 4/66* (2006.01)
  *H01M 4/70* (2006.01)
  *H01M 4/52* (2010.01)
  *H01M 10/052* (2010.01)
  *H01M 4/133* (2010.01)

(52) U.S. Cl.
  CPC ............ *H01M 4/133* (2013.01); *H01M 4/139* (2013.01); *H01M 4/52* (2013.01); *H01M 4/58* (2013.01); *H01M 4/66* (2013.01); *H01M 4/70* (2013.01); *H01M 10/052* (2013.01); *H01M 2004/027* (2013.01); *H01M 2004/028* (2013.01)

(56) References Cited

U.S. PATENT DOCUMENTS

| | | | |
|---|---|---|---|
| 5,707,763 A * | 1/1998 | Shimizu | C08F 259/08 429/217 |
| 7,820,328 B1 * | 10/2010 | Takeuchi | H01M 4/08 429/232 |
| 7,883,553 B2 * | 2/2011 | Mitchell | H01G 11/86 29/623.3 |
| 10,707,492 B2 * | 7/2020 | Amin-Sanayei | H01M 4/0416 |
| 2005/0064289 A1 | 3/2005 | Suzuki et al. | |
| 2006/0246343 A1 * | 11/2006 | Mitchell | H01M 4/58 429/121 |
| 2007/0122698 A1 | 5/2007 | Mitchell et al. | |
| 2010/0021819 A1 | 1/2010 | Zhamu et al. | |
| 2013/0216912 A1 | 8/2013 | Suh et al. | |
| 2015/0061176 A1 | 3/2015 | Bruckner et al. | |
| 2015/0303481 A1 * | 10/2015 | Duong | H01G 9/15 429/217 |
| 2016/0056493 A1 | 2/2016 | Umeda et al. | |
| 2017/0098818 A1 | 4/2017 | Cheng et al. | |
| 2017/0117583 A1 * | 4/2017 | Matsuno | H01M 4/505 |
| 2017/0319485 A1 * | 11/2017 | Takeuchi | A61K 9/146 |

FOREIGN PATENT DOCUMENTS

| | | |
|---|---|---|
| CN | 106463267 A | 2/2017 |
| DE | 102012203019 A1 | 8/2013 |
| JP | H05283064 A | 10/1993 |
| JP | H0738304 B2 | 4/1995 |
| JP | H08106897 A | 4/1996 |
| JP | H09180709 A | 7/1997 |
| KR | 20130096139 A | 8/2013 |
| KR | 20130117350 A | 10/2013 |
| KR | 20140136217 A | 11/2014 |
| KR | 20150120803 A | 10/2015 |

OTHER PUBLICATIONS

International Search Report including Written Opinion for Application No. PCT/KR2018/011281, dated Feb. 28, 2019, pp. 1-10.
Ludwig et al., Solvent-Free Manufacturing of Electrodes for Lithium-ion Batteries, Scientific Reports, Mar. 2016, pp. 1-10.
Search Report for Chinese Application No. 201880021739.7 dated Dec. 27, 2021. 3 pgs.
Cui Fude, "Textbook Series for the 21st Century", Planned Pharmacy Textbooks for National Medical Colleges and Universities, Pharmaceutics (2nd Edition), (Jan. 2011), 5 pgs.

* cited by examiner

METHOD FOR MANUFACTURING ELECTRODE FOR SECONDARY BATTERY AND ELECTRODE MANUFACTURED THEREBY

CROSS-REFERENCE TO RELATED APPLICATIONS

The present application is a national phase entry under 35 U.S.C. § 371 of International Application No. PCT/KR2018/011281, filed Sep. 21, 2018, which claims priority from Korean Patent Application No. 10-2017-0123727, filed Sep. 25, 2017, the disclosures of which are incorporated herein by reference in their entirety.

TECHNICAL FIELD

The present invention relates to a method of manufacturing an electrode for a secondary battery and an electrode manufactured thereby.

BACKGROUND ART

Lithium secondary batteries have been used not only as energy sources for mobile devices but also as power sources for electric vehicles (EVs) and hybrid electric vehicles (HEVs) in recent years. In addition, they are also used as assist power sources by using grids.

The manufacturing process of such a lithium secondary battery is roughly classified into an electrode process, an assembly process, and an activation process. The electrode process may be divided into an active material mixing process, an electrode coating process, a drying process, a rolling process, a slitting process, and a winding process.

Among them, the active material mixing process is a process of mixing a coating material for forming an electrode active layer in which an actual electrochemical reaction takes place at an electrode. Specifically, the active material mixing process is to a process of manufacturing in the form of a slurry having fluidity by mixing an electrode active material, which is an essential element of the electrode, with a conductive material and filler which are other additives, a binder for adhesion between particles and adhesion of a current collector, and a solvent for imparting viscosity and dispersing particles.

The composition thus mixed for forming the electrode active layer may be referred to as an electrode mixture in a broad sense.

Thereafter, an electrode coating process for applying the electrode mixture onto the electrically conductive current collector and a drying process for removing the solvent contained in the electrode mixture are performed, and the electrode is further rolled to a predetermined thickness.

On the other hand, as the solvent contained in the electrode mixture is evaporated during the drying process, defects such as pinholes and cracks may be induced in the pre-formed electrode active layer.

In addition, since the inside and the outside of the active layer are not uniformly dried, there may be a gap with the relatively later dried portion as the particles at the earlier dried portion float, i.e., due to the particles floating according to the difference in the solvent evaporation rate, thereby deteriorating the quality of the electrode.

In order to solve the above problems, a drying device capable of controlling the evaporation rate of the solvent while allowing the inside and outside of the active layer to be uniformly dried has been considered, but these drying devices are very expensive and require considerable cost and time for operation, and have poor manufacturing processability.

Therefore, there is a high need for a technology capable of improving the manufacturing processability of the electrode.

DISCLOSURE

Technical Problem

It is an object of the present invention to solve the above-mentioned problems of the prior art and the technical problems required from the past.

Specifically, an object of the present invention is to provide a method capable of manufacturing an electrode without a drying process by including a step of scattering and laminating a granular powder-like electrode material on a metal current collector.

Technical Solution

The present invention provides a method of manufacturing an electrode for a secondary battery, the method including:

preparing a mixture bulk of a lump form;

milling the mixture bulk to prepare granular powder having an average particle size of 30 micrometers to 180 micrometers;

scattering the granular powder on a surface of a metal current collector; and rolling the granular powder on the metal current collector, and laminating the granular powder on the metal current collector.

That is, in the method according to the present invention, since an electrode is manufactured by dispersing and laminating granular powder in place of a general electrode mixture having fluidity including a solvent, a drying process for removing the solvent is unnecessary, thereby significantly improving manufacturing processability of the electrode.

However, the flowability of the powder is important in order to enable the granular powder to be scattered, and the inventors of the present invention have found that when the Hausner ratio of the granular powder is 1.10 to 1.25, the scattering process can be easily performed and particularly, the average particle size of the granular powder is preferably in the range of 50 micrometers to 150 micrometers in order to satisfy the Hausner ratio.

When the Hausner ratio exceeds 1.25, the granular powders aggregate, making it difficult for the dispersing process to proceed. On the other hand, granular powders of less than 1.10 Hausner ratio are practically impossible to be manufactured.

The Hausner ratio is calculated by the tap density/bulk density of powder, and when the average particle size of the granular powder is less than 50 micrometers, it is not preferable because the powder may be blown away in the form of fine powders. When the average particle diameter of the granular powder is more than 150 micrometers, it is difficult to manufacture a good electrode because the surface of the electrode has a rugged shape even if scattering is possible. More optimal average particle size in the average particle size range of the granular powder may be between 95 micrometers and 105 micrometers, and specifically between 99 micrometers and 100 micrometers, and more specifically 100 micrometers.

The lamination process may include: rolling the granular powder on the metal current collector by a roller heated to a predetermined temperature; and enabling the rolled granular powder to be attached to the current collector by the pressure and temperature of the roller.

Herein, the attaching may be performed as at least one of the first binder and the second binder contained in the granular powder is melted.

On the other hand, in the present invention, the mixture bulk is prepared without a solvent, and specifically, the preparation process of the mixture bulk includes:

forming a first mixture by mixing a first binder, an electrode active material, and a conductive material;

mixing a second binder with the first mixture to form a second mixture; and applying a shear stress to the second mixture to fiberize the second binder to obtain a mixture bulk of a lump form in which the fibrous second binder is entangled on the second mixture.

This is a main feature of the present invention, and provides the following advantages.

First, the first binder and the second binder are charged stepwise, and the binding of the electrode active material and the conductive materials, which are components of the mixture, is stepwise induced, to thereby achieve adhesion to each other in a dispersed state.

Secondly, since it is manufactured without the use of a solvent, it is possible to implement a mixture having little fluidity, and in the case of such a mixture, it can be easily handled and processed into a desired form and used for various types of electrodes. Likewise, the mixture can be milled to produce granular powders that do not contain a solvent.

In one specific example, the first binder forms first particles which are electrode active materials, second particles which are conductive materials, and granular powders by bonding the first particles and/or the second particles.

The second binder forms a network physically connecting the powders while being fiberized in the mixing process.

Figure 6:
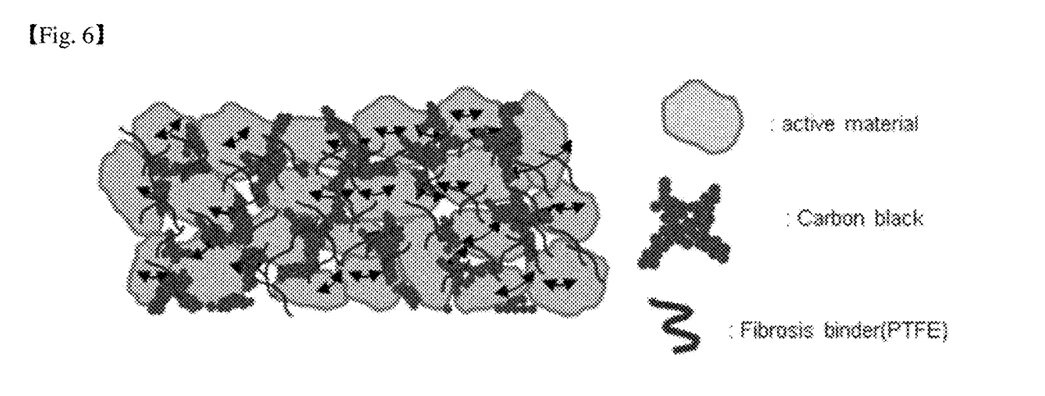
FIG. 6 is an enlarged schematic view of the mixture bulk of the present invention.

FIG. 6 is an enlarged schematic view of a composite bulk of the present invention. Referring to FIG. 6, an electrode active material (first particles) and a conductive material (second particles) are bound together by the first binder to form granular powders, and granular powders are physically connected by a fiberized second binder.

As a result, a lump-shaped mixture bulk having a solid content of 100% can be formed.

In one specific example, the second binder may be polytetrafluoroethylene (PTFE), and the first binder may be one or more selected from polyethylene oxide (PVDF), polyvinylidene fluoride (PVdF), and polyvinylidene fluoride-co-hexafluoropropylene (PVdF-HFP).

The content of the second binder may be between 0.8% and 1%, and more specifically between 0.9% and 1%, based on the total weight of the mixture bulk.

The content of the first binder may be between 2.1% and 2.4%, and more specifically be 2.1% or 2.4%, based on the total weight of the mixture bulk.

In one specific example, the electrode active material may be a positive electrode active material. Herein, in the first and second mixing and kneading processes, the extruder may be operated at a temperature of 20 to 60 degrees Celsius, at 30 rpm to 70 rpm with the maximum torque of 180 NM.

At the time of manufacturing the positive electrode, PVdFHFP (polyvinylidene fluoride hexafluoropropylene) may be used alone as the first binder, and polytetrafluoroethylene (PTFE) may be used alone as the second binder.

In the case of a positive electrode, the content of the first binder may be between 2.1% and 2.2%, more specifically be 2.1% of the total weight of the mixture bulk.

In addition, the content of the second binder in the positive electrode may be between 0.8% and 1%, and more specifically be 0.9% of the total weight of the mixture bulk.

The inventors of the present invention have made it possible to produce granular powders which can be produced as actual electrodes while satisfying the aforementioned Hausner ratio only when the first binder and the second binder satisfy the content range.

Particularly, when the content of the binder is out of the content range, the granular powder derived from the mixture bulk tends to be lumped with each other, or the granular powder having the predetermined average particle size may be difficult to be formed. As such, it is difficult for the Hausner ratio to be set as 1.10 to 1.25.

When the content of the second binder is less than 0.8%, since sufficient fiberization is not achieved, cohesiveness that maintains the shape of the mixture bulk is not present, and although the granular powder derived therefrom is rolled, there is a problem that it is difficult to form a perfect electrode layer. And when the content of the second binder exceeds 1%, over-torque of the extruder is caused due to excessive fiberization of the second binder, and consequently, it is difficult to obtain the mixture bulk.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_2M_xO_2$ (where M=Co, Ni, Fe, Cr, Zn or Ta 이 0|고, x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The electrode active material may also be a negative electrode active material. Herein, in the first and second mixing and kneading processes, the extruder may be operated at a temperature of 80 to 120 degrees Celsius, at 30 rpm to 70 rpm with the maximum torque of 80 NM.

In the preparation of the negative electrode, a PVdF-HFP (polyvinylidene fluoride-co-hexafluoropropylene) alone may be used as the first binder, or in some cases, a mixture of polyethylene oxide (PVDF) and polyvinylidene fluoride-co-hexafluoropropylene (PVdF-HFP) may be used as the first binder.

Here, PEO and PVdF-HFP can be mixed in a ratio of 1:9 to 9:1, specifically 2:8 to 8:2, more specifically 4:6 to 6:4.

The second binder may be polytetrafluoroethylene (PTFE) alone.

In the case of a negative electrode, the irreversibility due to the fibrous second binder may be increased, so the content of the second binder should be particularly carefully checked.

Accordingly, in the present invention, the content of the second binder may be between 0.9% and 1%, and more specifically be 1% of the total weight of the mixture bulk.

The content of the first binder may be between 2.3% and 2.4%, and more specifically be 2.4% of the total weight of the mixture bulk.

Examples of the negative electrode active material include carbon such as non-graphitized carbon and graphite carbon; metal complex oxide such as $Li_xFe_2O_3 (0 \le x \le 1)$, $Li_xWO_2 (0 \le x \le 1)$, $Sn_xMe_{1-x}Me'_yO_z$ (Me:Mn, Fe, Pb, Ge; Me': Al, B, P, Si, groups 1, 2, and 3 of the periodic table, halogen; $0 < x \le 1$; $1 \le y \le 3$; $1 \le z \le 8$); lithium alloy; silicon alloy; tin alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The conductive material may typically be added in an amount of 1 to 30 wt % based on the total weight of the mixture. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

In some cases, a filler, which is a component for suppressing the expansion of the electrode, may be further added in the bulk-forming process. The filler is not particularly limited as long as it is a fibrous material without causing a chemical change in the battery, and examples thereof include olefin polymers such as polyethylene and polypropylene; and fibrous materials such as glass fibers and carbon fibers.

The present invention also provides a battery for a secondary battery manufactured by the above method, more particularly, a negative electrode or a positive electrode for a secondary battery.

The current collector, which forms the electrode, is not particularly limited as long as it has high conductivity without causing a chemical change in the battery. For example, the current collector may be made of a metal such as stainless steel, aluminum, nickel, titanium, sintered carbon, cooper, or aluminum or stainless steel of which the surface is treated with carbon, nickel, titanium, or silver, or the like. The current collector may have fine irregularities on the surface thereof to increase the adhesion of the positive electrode active material, and various forms such as a film, a sheet, a foil, a net, a porous body, a foam, and a nonwoven fabric are possible.

Advantageous Effects

As described above, in the method according to the present invention, since an electrode is manufactured by dispersing and laminating granular powder in place of a general electrode mixture having fluidity including a solvent, a drying process for removing the solvent is unnecessary, thereby significantly improving manufacturing processability of the electrode.

DETAILED DESCRIPTION OF THE PREFERRED EMBODIMENTS

Hereinafter, the present invention will be described with reference to embodiments thereof, but it should be understood that the scope of the present invention is not limited thereto.

Example 1

Among the total weight of the mixture bulk, 94% by weight of a lithium-transition metal composite oxide including nickel, manganese and cobalt, 3% by weight of Denka black and 2.1% by weight of PVDF-HFP were charged into a Rheomix 300™ extruder of Thermo. Then the mixing is performed at 40 degrees C. for about 5 minutes at a maximum torque of 180 nm and 50 rpm. Then PTFE corresponding to 0.9% by weight among the total weight of the already injected materials was added and the mixture was further mixed for about 10 minutes to obtain a mixture bulk.

The mixture bulk was milled to produce granular powders having an average particle size of 100 micrometers. Milling was carried out using ZM200, and 6000 RPM and 0.25 mm mesh was used.

Example 2

Among the total weight of the mixture bulk, 95.5% by weight of a lithium-transition metal composite oxide including nickel, manganese and cobalt, 1.5% by weight of Denka black and 2.1% by weight of PVDF-HFP as the conductive material were charged into a Rheomix 300™ extruder of Thermo. Then the mixing is performed at 40 degrees C. for about 5 minutes at a maximum torque of 180 nm and 50 rpm. Then PTFE corresponding to 0.9% by weight among the total weight of the already injected materials was added and the mixture was further mixed for about 10 minutes to obtain a mixture bulk.

The mixture bulk was milled to produce granular powders having an average particle size of 100 micrometers. Milling was carried out using ZM200, and 6000 RPM and 0.25 mm mesh was used.

Comparative Example 1

Among the total weight of the mixture bulk, 93.4% by weight of a lithium-transition metal composite oxide including nickel, manganese and cobalt, 3% by weight of Denka black and 2.1% by weight of PVDF-HFP as the conductive material were charged into a Rheomix 300™ extruder of Thermo. Then the mixing is performed at 40 degrees C. for about 5 minutes at a maximum torque of 180 nm and 50 rpm. Then PTFE corresponding to 1.5% by weight among the total weight of the already injected materials was added and the mixture was further mixed for about 10 minutes to obtain a mixture bulk.

The mixture bulk was milled to produce granular powders having an average particle size of 100 micrometers. Milling was carried out using ZM200, and 6000 RPM and 0.25 mm mesh was used.

Comparative Example 2

Among the total weight of the mixture bulk, 94.9% by weight of a lithium-transition metal composite oxide including nickel, manganese and cobalt, 1.5% by weight of Denka black and 2.1% by weight of PVDF-HFP as the conductive material were charged into a Rheomix 300™ extruder of Thermo. Then the mixing is performed at 40 degrees C. for about 5 minutes at a maximum torque of 180 nm and 50 rpm. Then PTFE corresponding to 1.5% by weight among the total weight of the already injected materials was added and the mixture was further mixed for about 10 minutes to obtain a mixture bulk.

The mixture bulk was milled to produce granular powders having an average particle size of 100 micrometers. Milling was carried out using ZM200, and 6000 RPM and 0.25 mm mesh was used.

Comparative Example 3

Granular powders were prepared in the same manner as in Example 1, except that 2.5% by weight of PVDF-HFP and 0.5% of PTFE were added.

Comparative Example 4

96% by weight of a lithium-transition metal composite oxide including nickel, manganese and cobalt, 2% by weight of Denka black and 2% by weight of PVDP were mixed and NMP (Nmethyl pyrrolidone) was added to prepare an electrode slurry.

Experimental Example 1

For each of the powders prepared in Examples 1 and 2 and Comparative Examples 1 and 2, tap density and bulk density were measured, respectively. The tap density was measured after performing tapping 2000 times using TAP-2S manufactured by LOGAN, a tap density measuring instrument. The bulk density was derived by measuring the weight and volume of the powder and dividing the weight by the volume before measuring the tap density. Based on this, the Hausner ratio according to the following equation was calculated and the results are shown in Table 1 below.

Hausner Ratio=Tap Density/Bulk Density

As shown in Table 1 below, it can be seen that the Hausner ratio varies greatly depending on the content of the first binder and the second binder.

TABLE 1

|  | Bulk density | Tap density | Hausner ratio |
| --- | --- | --- | --- |
| Example 1 | 1.25 | 1.51 | 1.21 |
| Example 2 | 1.20 | 1.45 | 1.21 |
| Comparative Example 1 | 0.71 | 1.20 | 1.68 |
| Comparative Example 2 | 0.99 | 1.53 | 1.55 |

Experimental Example 2

The powders prepared in Examples 1 and 2 and Comparative Examples 1 and 2 were dispersed on a current collector of aluminum and the aggregation phenomenon of the powders was observed. The results are shown in Table 2. The states of the powders prepared in Example 1 and Comparative Example 1 are representatively shown in FIG. 1 and FIG. 2, respectively.

TABLE 2

|  | Whether it is lumped (○/X) |
| --- | --- |
| Example 1 | X |
| Example 2 | X |
| Comparative Example 1 | ○ |
| Comparative Example 2 | ○ |

Figure 1:
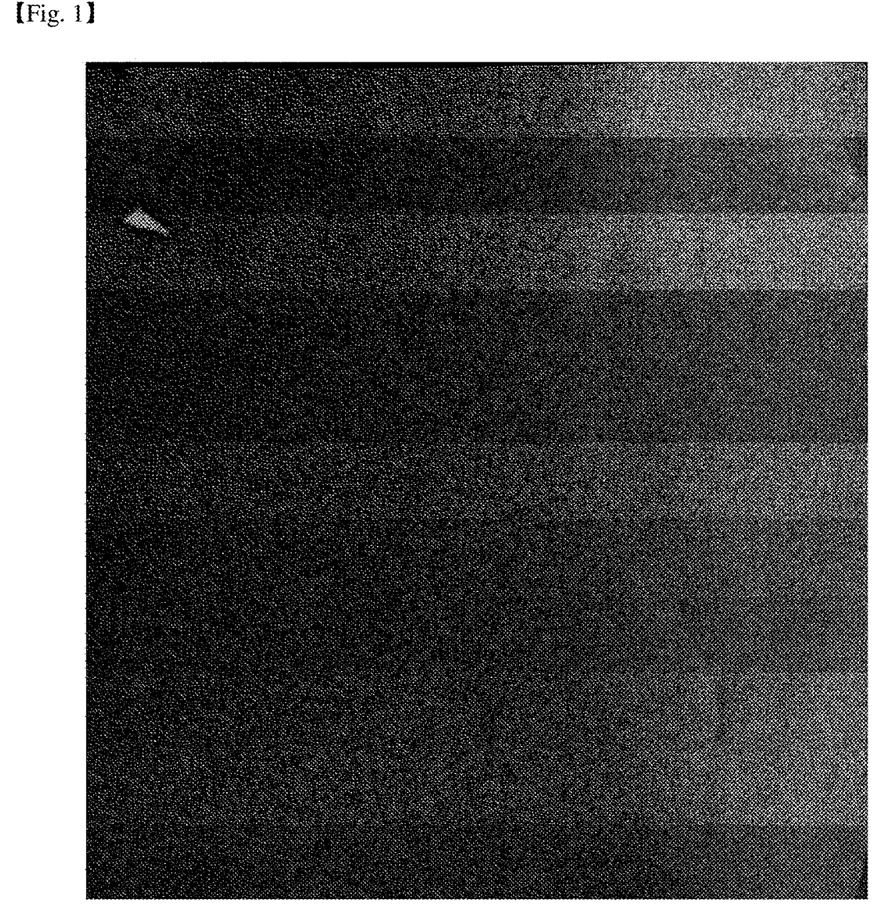
FIG. 1 is a photograph of the granulated powders in a scattered state prepared in Example 1.
Figure 2:
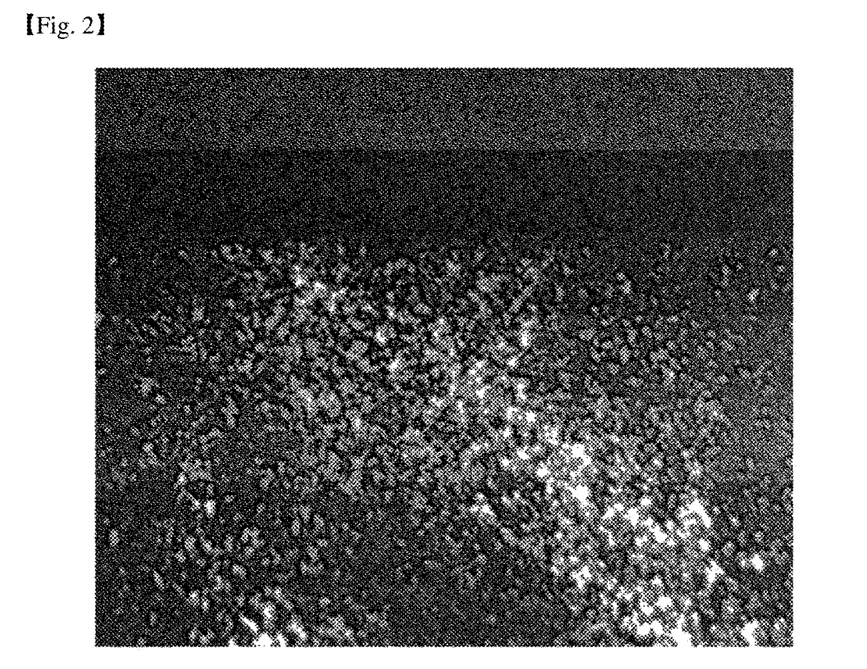
FIG. 2 is a photograph of the granulated powders in a scattered state prepared in Comparative Example 1.

As shown in FIG. 1 and Table 2, according to the embodiment of the present invention, the powder prepared to satisfy the Hausner ratio of 1.10 to 1.25 is present on the surface of the current collector in a smooth form without aggregation. That is, it can be seen that the electrode manufacturing can be performed by the scattering process of the granular powder.

On the other hand, in the case of Comparative Example 1 and Comparative Example 2, in which the Hausner ratio is relatively high, it can be confirmed that the uneven electrode surface is formed by lumps of the powders.

Accordingly, it can be seen that the powders of Comparative Example 1 and Comparative Example 2, which are out of the Hausner ratio range according to the present invention, are difficult to produce the scattering process and good quality electrodes due to the lumps.

Experimental Example 3

Figure 3:
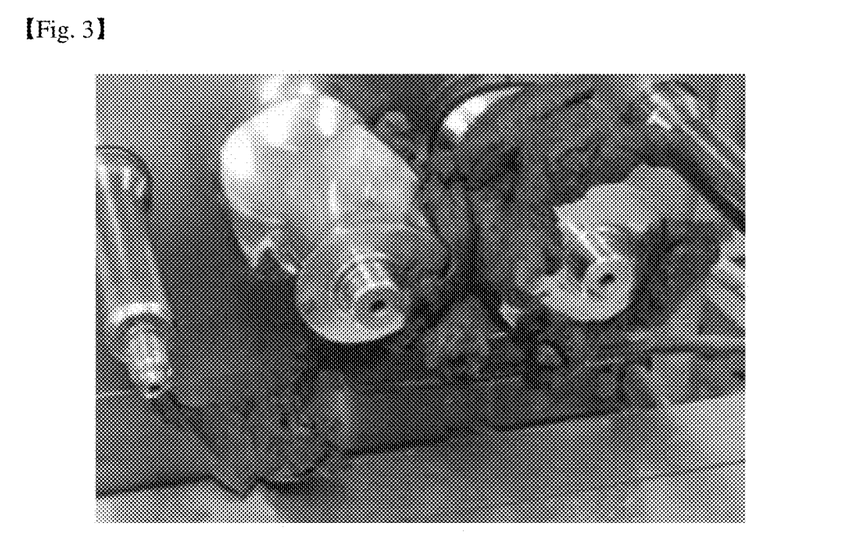
FIG. 3 is a photograph showing the shape of a mixture bulk prepared in Example 1.
Figure 4:
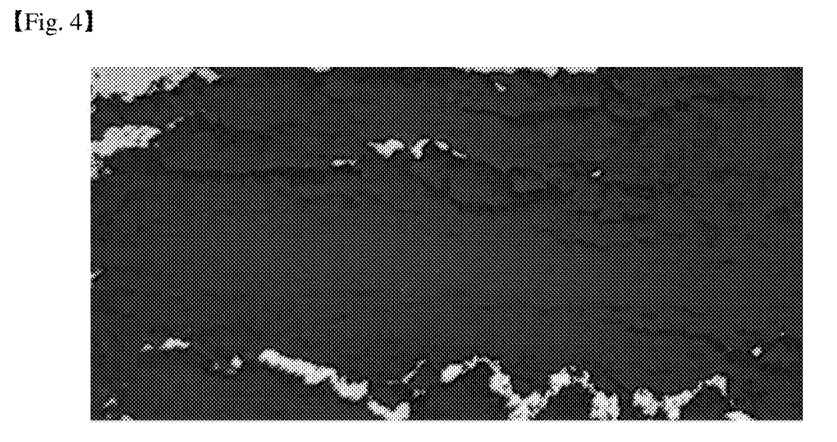
FIG. 4 is a photograph showing the shape of a mixture bulk prepared in Comparative Example 3.

The shapes of the mixture bulks prepared in Example 1 and Comparative Example 3 were visually compared, and the resulting photographs are shown in FIGS. 3 and 4, respectively.

In the case of FIG. 3, which is a result of Example 1, it can be seen that the mixture bulk is obtained in the form of a lump in which the electrode mixture is fully aggregated.

In the case of FIG. 4, which is a result of Comparative Example 3, it can be seen that the mixture bulk is incomplete and not agglomerated. This is presumably due to the fact that due to the relatively small amount of the second binder, fibrosis to bind the electrode active materials is not sufficiently formed, and therefore the cohesive force is not inherent enough to form a certain shape of the mixture bulk.

Manufacturing Example 1

The powders prepared in Example 1 were dispersed on the current collector of aluminum and then rolled to produce a first positive electrode having an electrode layer with a thickness of 1 micrometer.

A negative electrode was prepared using a flake artificial graphite as an active material. And coin cells of 1 Ah were prepared by using the first positive electrode prepared as described above, the negative electrode and a solvent of EC:DMC:DEC=1:2:1 with an electrolyte containing 1M LiPF$_6$.

Manufacturing Example 2

The electrode slurry prepared in Comparative Example 4 was coated on the current collector made of aluminum, followed by rolling and drying to prepare a second positive electrode having an electrode layer with a thickness of 1 micrometer.

A negative electrode was prepared using a flake artificial graphite as an active material. And coin cells of 1 Ah were prepared by using the second positive electrode prepared as described above, the negative electrode and a solvent of EC:DMC:DEC=1:2:1 with an electrolyte containing 1M LiPF$_6$.

Experimental Example 4

Figure 5:
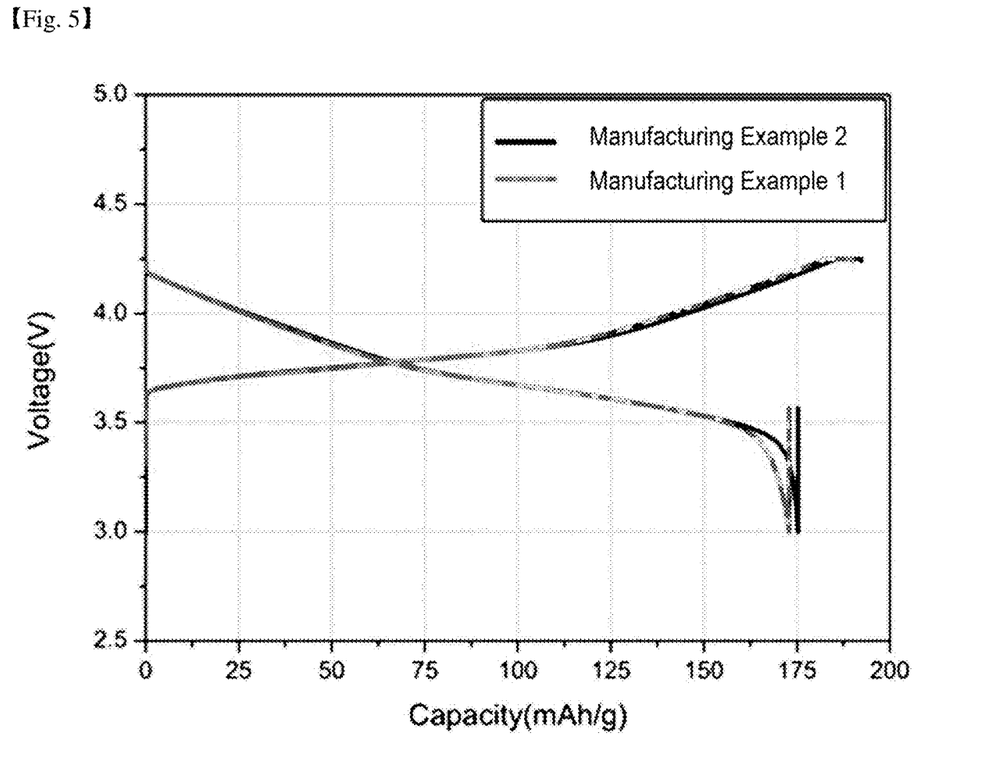
FIG. 5 is a graph showing changes in voltage and capacity of the coin cells manufactured in Manufacturing Example 1 and Manufacturing Example 2.

The charging and discharging of the coin cells manufactured in Manufacturing Examples 1 and 2 were performed, and the voltage and capacity changes according thereto were shown in FIG. 5.

Referring to FIG. 5, a coin cell including a second positive electrode made of an electrode slurry and a coin cell including a first positive electrode made by a dispersion of powder have almost the same performance.

That is, the first positive electrode manufactured according to the present invention has almost the same level of performance as the second positive electrode although the drying process can be omitted, unlike the second positive electrode.

While the present invention has been described with reference to examples, it is to be understood that the invention is not limited to the examples, but is intended to cover various modifications and equivalent arrangements included within the spirit and scope of the appended claims.

The invention claimed is:

1. A method of manufacturing an electrode for a secondary battery, comprising:
    preparing a mixture bulk of a lump form;
    milling the mixture bulk to prepare a granular powder having an average particle size of 30 micrometers to 180 micrometers;
    scattering the granular powder on a surface of a metal current collector; and
    rolling the granular powder on the metal current collector, and laminating the granular powder on the metal current collector,
    wherein the preparing of the mixture bulk comprises:
    forming a first mixture by mixing a first binder, an electrode active material, and a conductive material;
    mixing a second binder with the first mixture to form a second mixture; and
    applying a shear stress to the second mixture to fiberize the second binder to obtain the mixture bulk of a lump form in which the fibrous second binder is entangled in the second mixture; and
    wherein a Hausner ratio of the granular powder is between 1.10 and 1.25
    wherein a content of the second binder is not less than 0.8% and not more than 1% based on total weight of the mixture bulk;
    wherein a content of the first binder is not less than 2.1% and not more than 2.4% based on a total weight of the mixture bulk.

2. The method of claim 1, wherein the second binder is polytetrafluoroethylene (PTFE).

3. The method of claim 1, wherein the first binder is one or more selected from the group consisting of polyethylene oxide (PEO), polyvinylidene fluoride (PVdF), and polyvinylidene fluoride-co-hexafluoropropylene (PVDF-HFP).

4. The method of claim 1, wherein the electrode active material is a positive electrode active material.

5. The method of claim 1, wherein the electrode active material is a negative electrode active material.

6. The method of claim 1, wherein the laminating comprises:
    rolling the granular powder on the metal current collector by a roller heated to a predetermined temperature, to produce a rolled granular powder; and
    attaching the rolled granular powder to the current collector by using the pressure and temperature of the roller.

7. The method of claim 6, wherein the attaching is performed as at least one of the first binder and the second binder contained in the granular powder is melted.

* * * * *